United States Patent [19]

Mohri et al.

[11] Patent Number: 4,488,436
[45] Date of Patent: Dec. 18, 1984

[54] PRESSURE SENSOR

[75] Inventors: Kaneo Mohri, Fukuoka; Takeshi Nakane, Okazaki, both of Japan

[73] Assignee: Aisin Seiki Kabushiki Kaisha, Kariya, Japan

[21] Appl. No.: 582,162

[22] Filed: Feb. 27, 1984

Related U.S. Application Data

[63] Continuation of Ser. No. 416,279, Sep. 9, 1982, abandoned.

[30] Foreign Application Priority Data

Sep. 9, 1981 [JP] Japan .............................. 56-141852

[51] Int. Cl.³ ................................................. G01L 9/04
[52] U.S. Cl. .......................................... 73/726; 338/4; 338/42
[58] Field of Search ................. 73/720, 721, 726, 727, 73/705; 338/4, 42, 2, 3

[56] References Cited

U.S. PATENT DOCUMENTS 4,321,832  3/1982  Runyan ................................. 73/726
4,451,817  5/1984  Zulliger ................................ 338/47

Primary Examiner—Donald O. Woodiel
Attorney, Agent, or Firm—Oblon, Fisher, Spivak, McClelland & Maier

[57] ABSTRACT

A pressure sensor converts a fluid pressure into electric signals by means of a deformation of a diaphragm. The pressure sensor includes a resistance body means made of an amorphous metal material used as material for a strain gauge. The resistance body means has resistance body elements composing each side of a bridge circuit, thereby obtaining the signal to the pressure by means of an output of the bridge circuit.

8 Claims, 9 Drawing Figures

PRESSURE SENSOR

This application is a continuation of application Ser. No. 416,279, filed Sept. 9, 1982, now abandoned.

BACKGROUND OF THE INVENTION

1. Field of the Invention

This invention relates to a pressure sensor which converts fluid pressures into electric signals, and more particularly to a pressure sensor which detects fluid pressures by means of a diaphragm and converts distortions of the diaphragm into electric signals.

2. Prior art of the Invention

This type pressure sensor generally detects changes in fluid pressure by means of distortions of diaphragm and generates output powers by means of a strain gauge attached to the diaphragm. In such pressure sensor, a metal resistance wire such as nickel-copper system, or a semiconductor of a piezo-resistance form or a diffusion form has been used as strain gauge. In the strain gauge of the metal resistance wire where the stability in temperatures will be high, however, there are some drawbacks that the output voltage will be small, for example under 8 mV, that the maximum using temperature will be low, for example order of 80° C., and that the metal resistance wire will be apt to be destroyed due to the excess distortion because the maximum anti-tension is small. In the strain gauge of the semiconductor where the sensibility, namely, the rate of the gauge will be high, however, there are some drawbacks that the stability in temperatures will be low, for example above 0.1% FS/°C., where FS represents full scale, that the maximum using temperature will be low, for example 100° C., and that a countermeasure for protecting the semiconductor should be necessary because the semiconductor is weak in an impulsive force. Accordingly, the application scope of the gauge will be much limited due to the above characteristics of the strain gauge.

SUMMARY OF THE INVENTION

An object of the present invention is, therefore, to eliminate the above mentioned drawbacks of prior pressure sensors.

Another object of the present invention is to provide a new and improved pressure sensor which is of wide application and which is easy in use.

Still another object of the present invention is to provide a new and improved pressure sensor which is simple in construction, economical in manufacturing and high reliable in operation.

The present invention utilizes an amorphous metal material as material for a strain gauge. A resistance body means made of the amorphous metal material comprises at least four resistance body elements, two groups having two elements, respectively, being located on the lines intersecting at right angles each other. Both the lines are positioned in the radial directions of a diaphragm, and all the resistance body elements are positioned in the substantially same direction. Each resistance body can compose each side of a bridge circuit, and then the signal corresponding to the pressure can be obtained from the output of the bridge circuit. By means of the above-mentioned construction, the pressures can be converted into electric signals as changes in resistance value of the amorphous metal material.

The amorphous metal material has following characteristics.

(1) Changes in electric resistance corresponding to changes in fluid pressure is linear, and there is little hysteresis to increasing and decreasing of the pressure.

(2) The maximum (saturated value) of the changing rate of the electric resistance is high such as 5~6%. Since the resistivity of the amorphous metal is several times higher than that of a crystalline substance material such as 160~190 (ul·cm), the absolute value of changes in the resistance to the stress is very high.

(3) The reliability to the excess stress is high due to the strong resilient body the maximum anti-tension of which is very high such as 200~400 kg/mm$^2$.

(4) Since the temperature of the crystallization is high such as 500° C., the maximum using temperature is also high such as 200° C.

(5) Since a plate of thin band shape, for example of 20 $\mu$m width and 30 $\mu$m thickness, can be obtained with ease, the design can be made with ease. In particular, the amorphous metal into which small quantities of chromium element will be added has a large rate of resilient distortion, and has a superior corrosion resistance.

Thus, since the above amorphous metal material is used to detect the deformation of the diaphragm, it is possible to provide a pressure sensor which is of wide application.

BRIEF DESCRIPTION OF THE DRAWINGS

Further objects and features of the present invention will be understood more clearly and fully from the following detailed description of preferred embodiments thereof, when read with reference ot the accompanying drawings, in which:

FIG. 1b is an enlarged sectional view taken along the line 1B—1B of FIG. 1a;

FIG. 6 is a partial enlarged plain view of a resistance body 3a;

DETAILED DESCRIPTION OF THE INVENTION

Figure 1A:
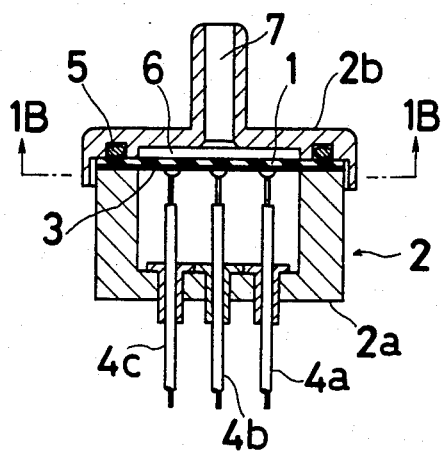
FIG. 1a is a vertical sectional view of a pressure sensor in accordance with one embodiment of the present invention.
Figure 1B:
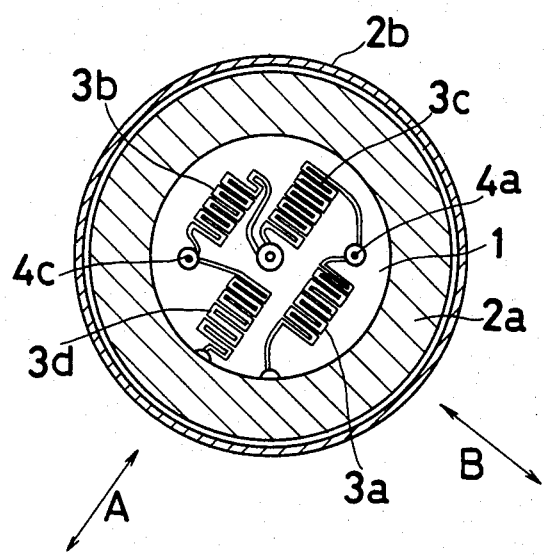

Referring now to FIGS. 1a and 1b, an electric insulating diaphragm 1 is rigidly mounted by a main body 2a and a cap member 2b of a casing member 2. An amorphous band plate of Fe$_{78}$Cr$_3$ (Si-B)$_{19}$ is beforehand secured to a back surface of diaphragm 1 (below side of FIG. 1a), and then four resistance bodies 3a, 3b, 3c and 3d of rectangular form are formed by means of etching process of the amorphous band plate. Each resistance body is positioned in the same direction as shown by an arrow A, and then the center of the diaphragm 1 is surrounded by the resistance bodies 3a, 3b, 3c and 3d. The resistance bodies 3a, 3b and the resistance bodies 3c and 3d are positioned symmetrically, respectively. The length component of each resistance body 3a, 3b, 3c and 3d in a direction as shown by an arrow B has much proportion to the total length. in the absence of pressure each resistance body is constructed so as to have the substantially same electric characteristics. Lead wires 4a, 4b and 4c are connected with connecting portions between resistance bodies 3a and 3c, between resistance bodies 3c and 3b, and between resistance bodies 3b and 3d, respectively. Each one end of resistance bodies 3a and 3d is connected with the rest pattern of the amorphous band plate 3 which is put between the diaphragm 1 and casing main body 2a, and then is connected with the casing body 2a. An O-ring 5 is inserted in a groove of ring shape formed on the inner surface of the cap member 2b, thereby keeping a space 6 between the cap member 2b and the diaphragm 1 airtight. The cap member 2b has a fluid pressure input port 7 in communication with the space 6. The lead wires 4a, 4b and 4c are soft enough not to obstruct the deformation of the diaphragm 1.

Before explaining the operation of this embodiment, the basic principle, namely the changes in resistance to the tension of the amorphous metal material will be explained.

If a resistance value of the amorphous band with length l is R, changes $\Delta R$ in resistance value produced by the tension will have a connection with almost only an elongation $\Delta l$ of the amorphous band. Since the resistance rate and the volume are constant in spite of the elongation $\Delta l$, the following equation is formed.

$$(\Delta R/R) \approx 2(\Delta l/l) \tag{1}$$

Accordingly, since a maximum change rate $\Delta l/l$ of the amorphous metal material will be about 3%, a maximum resistance change rate $\Delta R/\Delta$ will be an order of 6%. This value 6% is larger than that of the metal resistance wire of a crystalline substance. Since the absolute value of the resistance change of the samples which are the same in length and in sectional area, is proportional to the resistance rate, the absolute value of the amorphous metal material is several times larger than that of the metal resistance wire of the crystalline substance. Furthermore, the amorphous metal material has a Young's modulus of the order of $10^4$ kg/mm$^2$, and is 20~30% smaller than that of the crystalline substance material, and as a result the amorphous metal material is high in elongation efficiency to the stress in comparison with the crystalline substance material.

Figure 3:
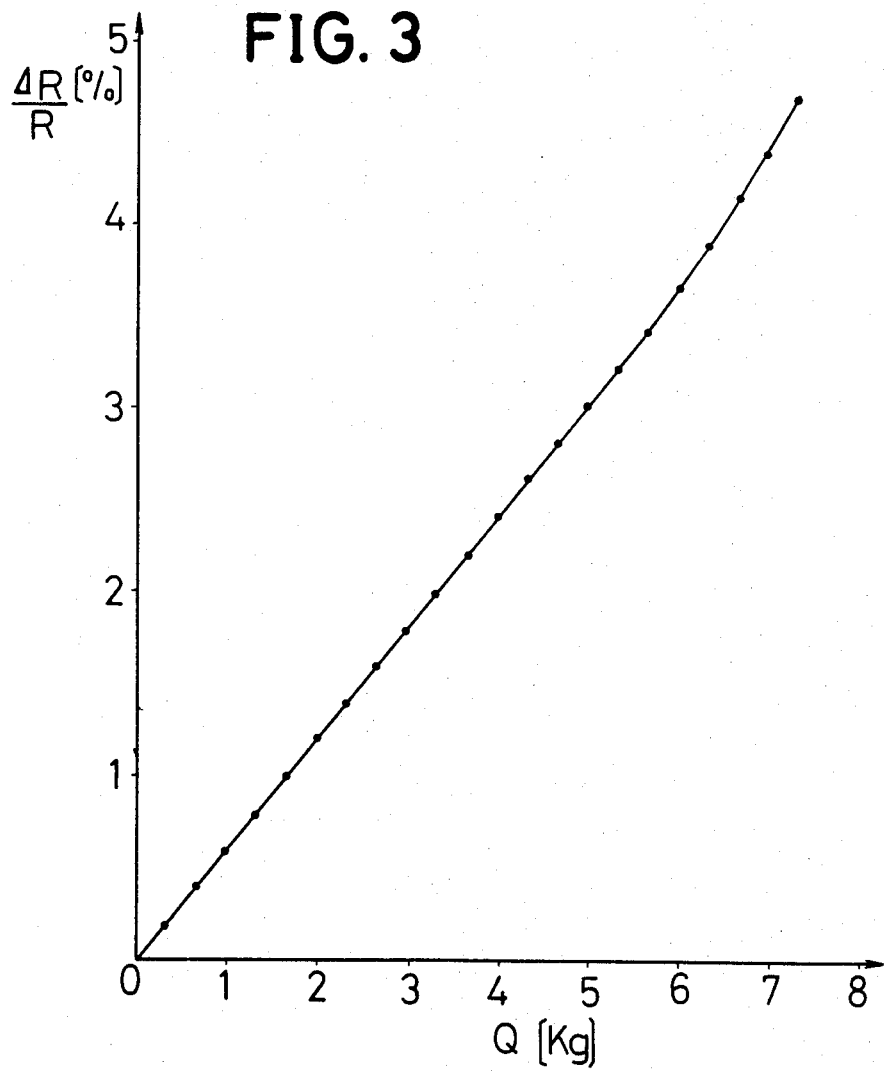
FIGS. 3, 4 and 5 are characteristics diagram showing the load and the resistance changing rate, characteristics diagram showing the number of loads which are applied and the terminal interval voltage, and characteristics diagram showing the temperature and the resistance changing rate, respectively.
Figure 2:
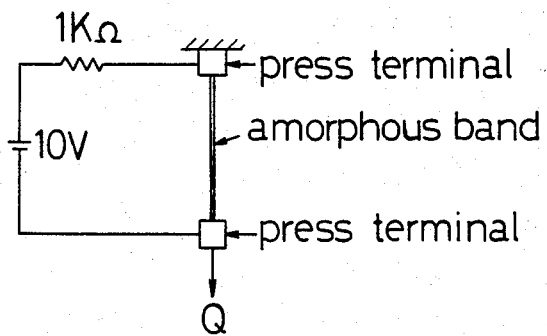
FIG. 2 is a circuit diagram for measuring electric characteristics of an amorphous metal band.

FIG. 3 is characteristics diagram showing the tension and resistance change rate ($\Delta R/R$), which shows a result of measuring the voltages of the press terminal interval when an amorphous band (width of 1 mm, thickness of 35 $\mu$m, and length of 100 mm) of Fe$_{78}$Cr$_3$(Si-B)$_{19}$ is placed on a brass press terminal, and a direct constant current of 10 m A flows, and then a load Q is impressed. In this measurement, after the load is increased from 0 to 7 kg, the load is decreased to 0 kg gradually. The change $\Delta R/R$ in resistance has a maximum hysteresis of 0.67% FS. When the load is from 0 kg to 4.5 kg (at this time $\Delta R/R$ is about 3%), the linearity is under 0.6% FS and satisfactory. In this measurement, a load of 4 kg is impressed 400 times on the band beforehand, thereby maintaining the stress distribution in a steady state.

Figure 4:
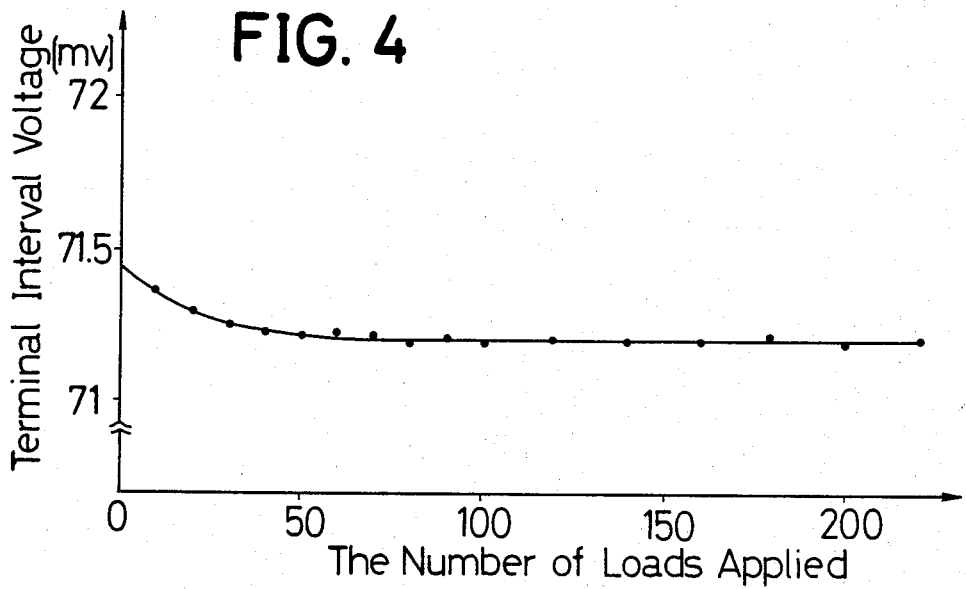

FIG. 4 is a characteristics diagram showing changes in the interval voltage to the number of times of the load impression when the load is 4 kg. In this measurement, when the number of times of the impression increases beyond about 100 times, change in the output voltage will disappear and attains a steady state.

Figure 5:
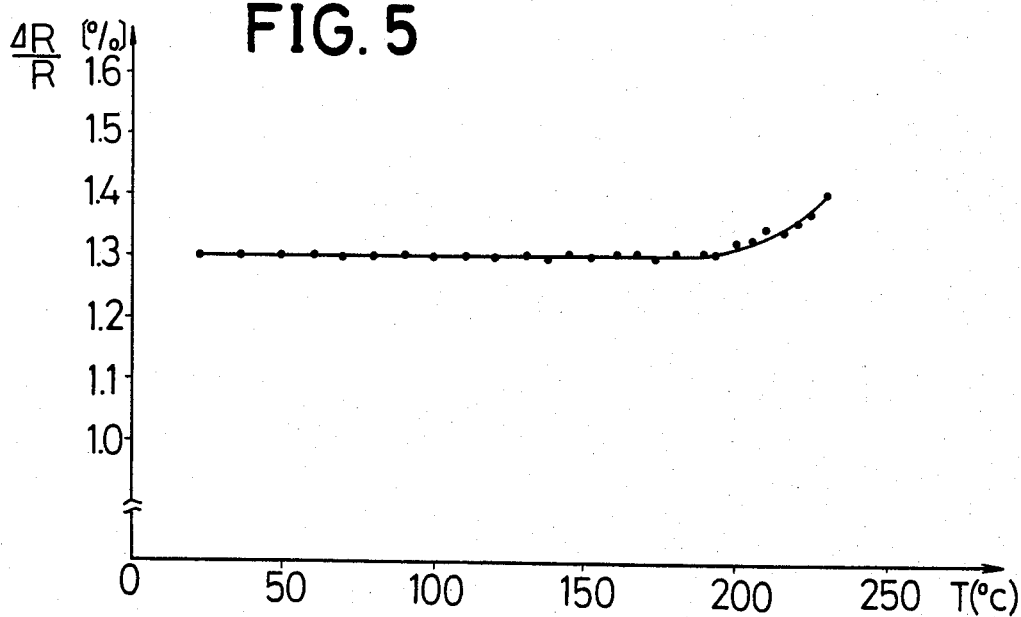

FIG. 5 is a characteristics diagram, which shows a result of measuring the resistance change rate $\Delta R/R$ by changing the ambient temperature T when the same amorphous band is heated at a temperature of 350° C. for two minutes and is cooled suddenly, and then the load Q of 4 kg is impressed after the load Q of 4 kg is impressed 400 times. In this measurement, when the ambient temperature T is under 195° C., the resistance change rate $\Delta R/R$ is almost constant, for example under 0.5% FS. When the temperature T is above 200° C., the change rate $\Delta R/R$ tends to increase.

Figure 6:
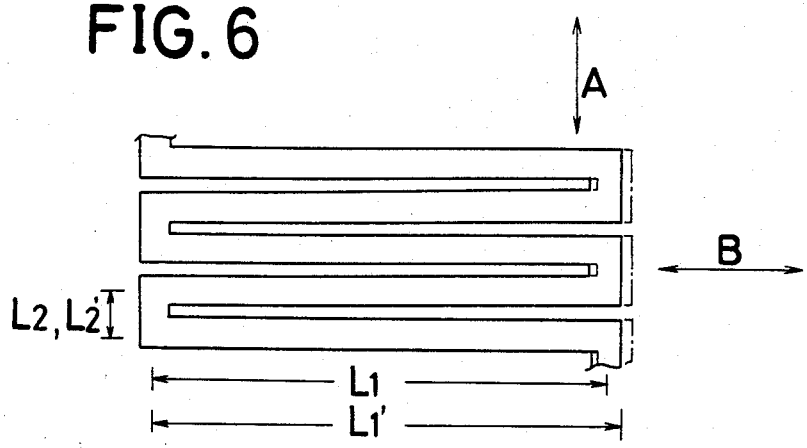

FIG. 6 is a partial enlarged plain view of a resistance body 3a.

When pressure is supplied to the fluid pressure input port 7 shown in FIG. 1a, pressure in the space 6 increases and then the diaphragm 1 is deformed. At this time, tension is applied to the diaphragm in the radial direction thereof. This tension is impressed on the resistance bodies 3a, 3b, 3c and 3d. Referring to FIG. 6, since tension is impressed on the resistance body 3a in the direction shown by the arrow B, a lenth $L_1$ in the direction of the arrow B is increased to a length $L_1'$. On the other hand, since the tension direction on the resistance body 3c is the direction shown by the arrow A, a length $L_2$ in the direction of the arrow A is increased to a length $L_2'$. In this pattern from, however, the length $L_1$ is much greater than the length $L_2$, namely $L_1 >> L_2$. Therefore, $\Delta L_2(L_2' - L_2)$ can be neglected with respect to $\Delta L_1(L_1' - L_1)$. The resistance body 3b is greatly increased as the resistance body 3a, while the resistance body 3d is little increased as the resistance 3c. As previously indicated, since the resistance value of the amorphous metal material changes in response to the length, the resistance values of the resistance bodies 3a, 3b change in response to the impressed tension.

Figure 7:
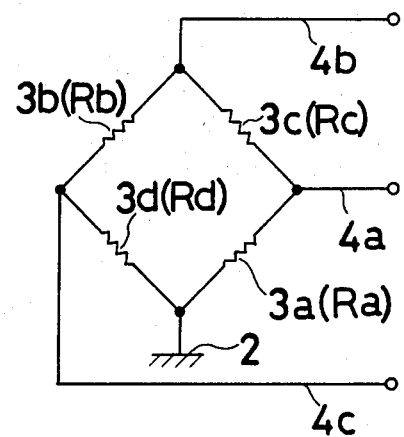
FIG. 7 is a diagram showing an circuit equivalent to the embodiment of FIGS. 1a and 1b.

FIG. 7 is a diagram showing a circuit equivalent to FIGS. 1a and 1b. The resistance bodies 3a, 3b, 3c and 3d are connected by a bridge circuit one another. In a condition that a direct alternating voltage is applied between the lead wire 4b and the casing member 2, if the pressure is not supplied to the port 7, the bridge circuit reaches the equilibrium state and then voltage is not generated at the output between lead wires 4a and 4c. That is to say, the equilibrium condition of the bridge circuit can be held, namely RaRb=RcRd, where Ra, Rb, Rc and Rd represent the resistance values of the resistance bodies 3a, 3b, 3c and 3d, respectively. If the pressure is supplied to the port 7, the resistance values of the resistance bodies 3a and 3b change into Ra' and Rb', respectively, wherein Ra' is greater than Ra, and Rb' is greater than Rb. Accordingly, the equilibrium of the bridge circuit is destroyed, and then the output voltage which corresponds to the supplied pressure will be obtained. If the ambient temperature changes, all the resistance bodies 3a, 3b, 3c and 3d have the same resistance value change. Therefore, the characteristics of the bridge circuit will not be affected by temperature as a whole.

Figure 8:
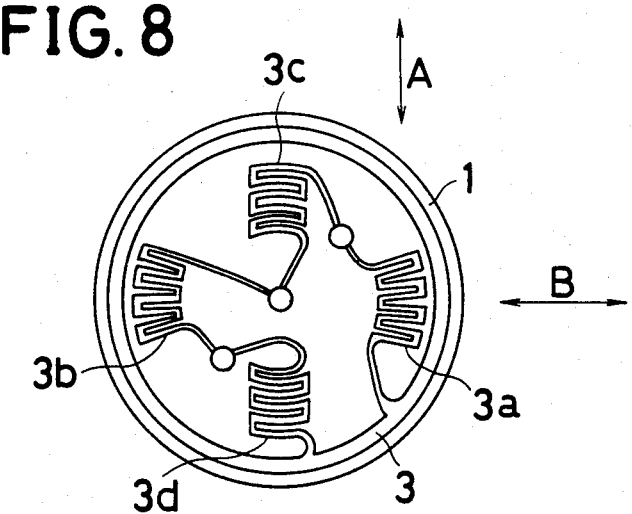
FIG. 8 is a plain view of a diaphragm and a resistance body in accordance with another embodiment of the present invention.

FIG. 8 is a plain view of the diaphragm 1 in accordance with another embodiment of the invention. In this embodiment, the main portions of the resistance bodies 3a, 3b, 3c and 3d are positioned in the substantial same direction shown by an arrow B. More particularly, the resistance bodies 3a and 3b are positioned in the radial direction of the diaphragm 1, while the resistance bodies 3c and 3d are positioned in the circumferential direction intersecting at right angels with the radial direction.

Thus, in the pressure sensor according to the present invention, the amorphous metal material is adopted as a means which converts the deformation of the diaphragm into the electric signal. Accordingly, this pressure sensor can be of wide application due to the many advantages of the amorphous metal material.

What is claimed is:

1. A pressure sensor for converting a fluid pressure into electric signals, said pressure sensor comprising:
    a diaphragm producing a tension in a radial direction thereof under the pressure;
    a casing member supporting said diaphragm; and
    a resistance body means being made of an amorphous metal and comprising two resistance body groups having at least two resistance body elements respectively, wherein said groups are positioned in radial directions of said diaphragm so as to intersect at right angles each other, and wherein said elements are positioned in the same direction;
    each of said resistance body elements having a portion which occupies a large proportion to the total length and which is positioned in the substantially same direction;
    said resistance body elements being able to be connected by a bridge circuit, wherein said elements intersecting at right angles each other may be constructed as adjacent sides of said bridge circuit.

2. A pressure sensor according to claim 1 wherein said resistance body means comprises four resistance body elements having equal electric characteristics in a steady state.

3. A pressure sensor according to claim 1 wherein said each resistance body element has a rectangular pattern.

4. A pressure sensor for converting a fluid pressure into electric signals, said pressure sensor comprising:
    a diaphragm producing a tension under the pressure;
    a casing member supporting said diaphragm;
    a resistance body means being made of amorphous metal material arranged on one side of said diaphragm, said resistance body means including a first resistance body group operable in response to said tension produced by said diaphragm under pressure in a circumferential direction and a second resistance body group operable in response to said tension produced by said diaphragm under pressure in a radial direction; and
    said first and second resistance body groups being connected to form a bridge circuit.

5. A pressure sensor according to claim 4, wherein:
    said first resistance body group has a portion which occupies a large proportion to the total length and extends in a circumferential direction; and
    said second resistance group has a portion which occupies a large proportion to the total length and extends in a radial direction.

6. A pressure sensor according to claim 4, wherein each of said first and second resistance body groups includes a pair of resistance body elements which are arranged parallel to each other.

7. A pressure sensor according to claim 6, wherein:
    said pair of resistance body elements of said first resistance body group has a portion which occupies a large proportion to the total length and extends in a circumferential direction; and
    said pair of resistance body elements of said second resistance body group has a portion which occupies a large proportion to the total length and extends in a radial direction.

8. A pressure sensor according to claim 7, wherein said first and second resistance body groups intersect at right angles.

* * * * *

UNITED STATES PATENT AND TRADEMARK OFFICE
CERTIFICATE OF CORRECTION

PATENT NO. : 4,488,436

DATED : DECEMBER 18, 1984

INVENTOR(S) : KANEO MOHRI ET AL

It is certified that error appears in the above-identified patent and that said Letters Patent is hereby corrected as shown below:

In column 2, line 10, delete "(ul·cm)" and insert therefor --($\mu\Omega$·cm)--.

In column 2, line 34, delete "ot" and insert therefor --to--.

In column 2, line 51, delete "an" and insert therefor --a--.

In column 3, line 16, delete "casing body" and insert therefor --casing main body--.

In column 3, line 39, delete "$\Delta R/\Delta$" and substitute therefor --$\Delta R/R$--.

In column 3, line 53, delete "characteristics diagram" and substitute therefor --is a characteristics diagram--.

In column 4, line 44, delete "one another" and substitute therefor --to one another--.

UNITED STATES PATENT AND TRADEMARK OFFICE
CERTIFICATE OF CORRECTION

PATENT NO. : 4,488,436

DATED : DECEMBER 18, 1984

INVENTOR(S) : KANEO MOHRI ET AL

It is certified that error appears in the above-identified patent and that said Letters Patent is hereby corrected as shown below:

In column 5, line 6, delete "angels" and substitute therefor --angles--.

In column 5, line 36, delete "right angles each other" and substitute therefor --right angles to each other--.

Signed and Sealed this

Thirteenth Day of August 1985

[SEAL]

Attest:

DONALD J. QUIGG

*Attesting Officer*   *Acting Commissioner of Patents and Trademarks*